Jan. 14, 1930.  J. REFSLAND  1,743,284
AEROPLANE
Filed Jan. 25, 1929
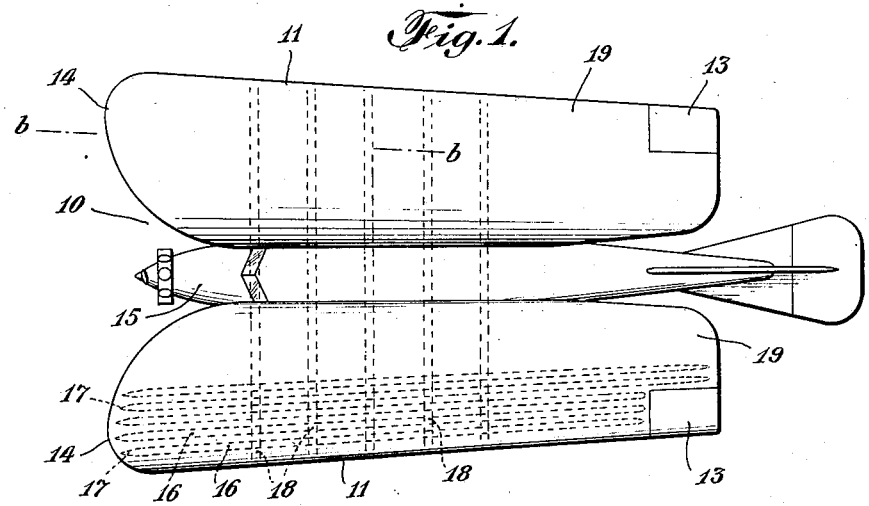
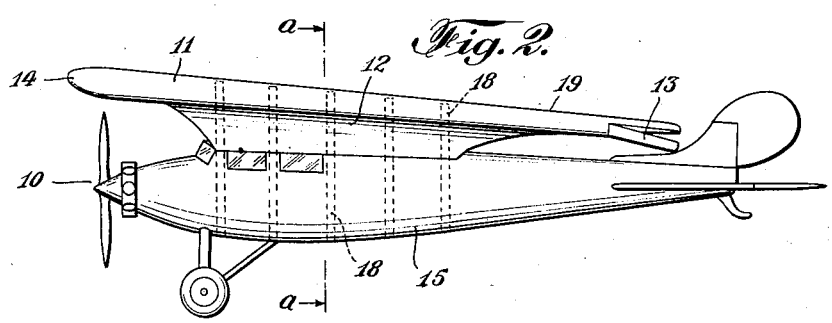
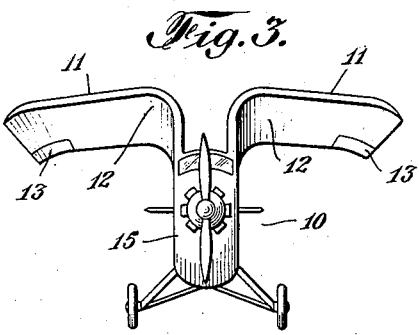
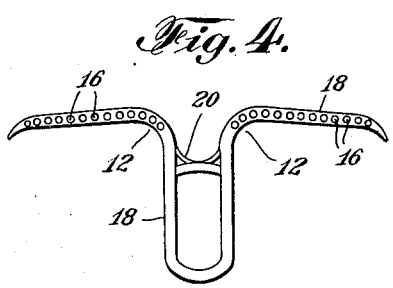
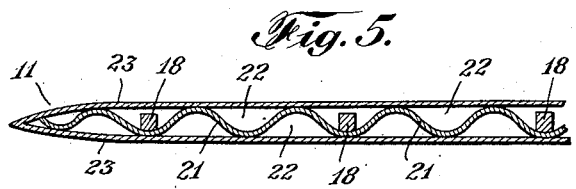
INVENTOR
Jacob Refsland
BY
ATTORNEY Patented Jan. 14, 1930

1,743,284

UNITED STATES PATENT OFFICE

JACOB REFSLAND, OF NEW ROCHELLE, NEW YORK

AEROPLANE

Application filed January 25, 1929. Serial No. 334,926.

This invention relates to new and useful improvements in aeroplanes and has for its object to provide a plane which on account of its special construction will prove considerably faster, consume less fuel and consequently have a much greater cruising radius than any of those now known and manufactured.

Another object of my present invention has been to provide a device which will prove strong, durable and safe in operation; with this latter end in view special reenforcements have been arranged at places, where experience has taught the danger of crumbling up lies, when a plane is going at high speed. The main feature of this invention is the shape and construction of the wings, and their relative position which in turn will eliminate or to a considerable degree minimize the resistance of the air and give to a plane steadiness of motion. At the same time it is thought and has been calculated, that an aeroplane constructed with a set of wings, as disclosed in this present device, will rise much quicker and encounter no great trouble in performing an almost vertical ascent.

A still further advantage resulting from this special construction resides in the fact, that this device will be able to take off from an ordinary turnpike making unnecessary the special construction of a runway; incidentally this plane will be able to land almost anywhere, even on water, as will be hereinafter further described.

Although obvious, it may be appropriate in this connection to point out, that very little hangar space will be required for an aeroplane constructed according to my present design.

As the construction, while very efficient, is comparatively simple the cost of manufacturing should be somewhat decreased.

With the above and other objects in view, this invention consists of the novel features of construction, combination and arrangements of parts, hereinafter fully described, claimed, and illustrated in the accompanying drawings forming parts of this specification, and in which similar characters of reference indicate corresponding parts in all views, and in which:

Figure 1 is a top plan view of an aeroplane constructed according to my invention; Fig. 2 is a side elevational view of same; Fig. 3 is a front view; Fig. 4 is a transverse sectional view taken on line a—a in Fig. 2, while Fig. 5 is a specific transverse sectional view taken on line b—b in Fig. 1.

Referring more particularly to the drawings, 10 indicates an aeroplane having arranged longitudinally disposed wings 11, 11 in contradistinction to the usually crosswise arranged wings.

The said wings have some similarity to the wings of a bird, being rounded at the front. In this connection it must be observed that the said front portion of the wings 14 may be arranged to project more or less in front of the body 15 of the plane in order to add to the capability of quick rising. The said wings are formed with an inner curvature 12 and have disposed the usual ailerons 13.

In Fig. 1 is shown a pair of wings each consisting of a skeleton of preferably longitudinally positioned tubes 16 formed with closed end portions 17 thereby making the said tubes airtight, incidentally adding to the floating capacity, if the said plane should be forced down on the water. Around the body 15 of the plane and extending to the very edge of the side of the wings are arranged in a transverse manner a plurality of girders 18, made of strong, suitable metal, thereby forming a solid web. The said skeleton or web is covered with a suitable strong canvas 19 of the kind generally used for this purpose. In order to lend further strength to the said construction the said girders are rigidly connected at the top of the body by means of cross members 20. The said girders may in order to avoid creating any air resistance be sunk into the body of the plane and will naturally be inside of the wings covered by the canvas, or outer surface of same. I have in Figure 5 shown a slight modification in the construction of the wings, the shape of the latter naturally remaining the same. The wing in this latter instance is formed with an inner throughout its length extending corrugated member 21 to which in turn the said girders 18 are rigidly connected in any suitable manner. Above and below the said corrugated member is then further arranged a covering consisting of metal sheets 23, which are connected in such a manner as to provide for airtight spaces 22, thereby adding to the floating capacity of the said aeroplane. It will be evident, that the light and yet strong construction thus described will be especially adaptable also to hydroplanes.

It deserves to be pointed out, that an aeroplane with wings constructed and arranged, as herein disclosed, should have a much greater lifting capacity at the same time offering less resistance to the air.

It is obvious that changes may be made in the form, construction and arrangement of the several parts, as shown, within the scope of the appended claims, without departing from the spirit of the invention, and I do not therefore limit myself to the construction and arrangement shown and described herein.

What I claim as new, and desire to secure by Letters Patent of the United States, is:

1. In a device of the class described, an aeroplane provided with lengthwise disposed wings of a substantially even width, each wing comprising an intermediate corrugated member, girders mounted around the body of the plane and extending across and above the said corrugated member to the edge thereof, a sheet metal covering above and below said corrugated member, the former being connected to the said member and girders and to each other in such a manner as to form intervening watertight spaces, and bracers disposed on top of the body and connecting the said girders, substantially as shown and described.

2. In a device of the class described, an aeroplane provided with lengthwise disposed wings, the latter being slightly narrowed in a rearward direction and arranged to project in front of the fuselage, each wing comprising an intermediate corrugated member, girders mounted around the body of the plane and extending across the said corrugated member to the edge thereof, a covering of a suitable material arranged above and below said corrugated member, the former being connected to the said member and girders and to each other in such a manner as to form intervening watertight spaces, and bracers disposed on top of the body and connecting the said girders, substantially as shown and described.

Signed at New York city in the county of New York and State of New York this 27th day of December, A. D. 1928.

JACOB REFSLAND.